Nov. 15, 1949 — H. HEIMANN — 2,487,803

SPRING RETAINING RING

Filed Aug. 21, 1947

HEINRICH HEIMANN, Inventor

Patented Nov. 15, 1949

2,487,803

UNITED STATES PATENT OFFICE 2,487,803

SPRING RETAINING RING

Heinrich Heimann, New York, N. Y., assignor to Waldes Kohinoor, Inc., Long Island City, N. Y., a corporation of New York Application August 21, 1947, Serial No. 769,857

2 Claims. (Cl. 85—8.5)

1

This invention relates to improvements in spring retaining rings of the type adapted to be sprung into a seating groove provided therefor in a carrying member such as a shaft and thereupon to provide an artificial shaft shoulder or abutment serving to locate and/or secure a machine part mounted on the shaft against axial displacement, as well as to improved retaining ring assemblies employing a spring retaining ring characterized as aforesaid.

The problem of providing precision retaining rings having pressure fit against the bottom of their grooves, so that no undesirable rotation of the ring relative to the shaft or machine part may take place, has been solved heretofore by a ring construction wherein the outer and inner circular edges of the ring are formed eccentric to each other by a calculated amount such that the ring maintains circularity in its stressed state. Accordingly, such a ring, when sprung into a seating groove whose bottom has a diameter slightly larger than that of the ring, exerts an all-around tight grip on the groove bottom, in contrast to rings with concentric circumferences which deform ovally when seated and hence fit loosely against the groove bottom.

The usual form of such a precision retaining ring is that of an open-ended ring having a short-width gap between its open ends. Since such a nearly closed ring is assembled by spreading it over the end of the shaft and shifting it along the length thereof to the plane of its seating groove, whereupon it is released to snap into the groove, a ring of this type is open to the disadvantage that assembly cannot be readily effected in applications wherein the end of the shaft is not accessible. In such applications, therefore, it becomes desirable to assemble the ring by spreading it transversely over the shaft in the plane of the seating groove. For this purpose, the so-called "open" spring rings have been developed, but the earlier forms of such open rings were open to the objection that, due to the large gap between the open ends thereof, the ring subtended an angle of only slightly more than 180°, and hence formed a relatively short length arcuate shoulder. Moreover, the prior open rings were devoid of tight fit against the groove bottom, because their inner circumference could not be substantially smaller than the groove bottom diameter, as otherwise the ring would tend to deform ovally when seated.

More recently, the objections to the open retaining ring have been overcome by various ring constructions which maintain the advantages of

2 the nearly closed ring, i. e. sufficient length of shoulder, ability to deform circularly, and precision fit against the groove bottom for its full arcuate length, while at the same time being designed to permit of a considerable amount of spreading in assembly without likelihood of breakage or the danger of taking on a permanent set. One such ring construction is disclosed in United States Patent No. 2,026,454, dated December 31, 1935, according to which an open ring is made sufficiently resilient to be substantially spread without weakening of its middle section, which is most severely affected when the ring is spread directly over its shaft. Such resiliency without weakening is provided in the patented ring by forming two recesses in its inner circumference adjacent its middle section, the recesses being symmetrically arranged to provide a tongue which protrudes inwardly at its middle section. Two other protrusions or tongues whose edges define the open ends of the ring combine with the edge of the middle protrusion to give the ring secure holding power, with the substantial area of metal in the middle portion taking up the bending strains imparted to the ring when it is spread.

While an open ring according to United States Patent No. 2,026,454 operates satisfactorily in the usual case, it, too, is open to the objection that it is operative only in its own plane and hence is unable to exert any endwise force or thrust against the machine part located or retained thereby, being therefore incapable of taking up end play between the ring and machine part likely to result from unavoidable tolerances in the length of the machine part, in the thickness of the ring, and in the location of the groove. Even in assemblies made to close tolerances, such unavoidable tolerances may accumulate to an amount equalling the sum total of the enumerated tolerances mentioned above, and when this condition occurs the desirable precision location of the machine part on shaft is impaired.

A principal object of the invention is to improve open retaining rings of the type disclosed in United States Patent No. 2,026,454 aforesaid in such manner as to permit such a ring to exert pressure in endwise direction on a machine part being held sufficient to take up any avoidable end play in the mounting thereof as may result from the unavoidable tolerances in the axial length of the machine part, in the thickness of the ring itself, and in the location of its seating groove. More particularly, an object of the invention is to impart to an open ring of the type disclosed in the prior patent aforesaid the ability to exert pressure in axial direction, while at the same time preserving its ability of exerting secure holding power against the bottom of the groove in which it seats.

Other objects will be in part obvious and in part hereinafter pointed out in the following detailed description of an improved open retaining ring according to the invention and a typical retaining ring asssembly employing such a ring, both as shown in the accompanying drawing wherein—

Figure 1:
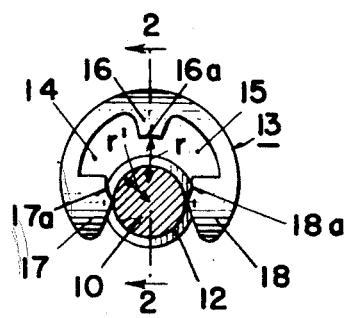
Fig. 1 illustrates an open retaining ring according to the invention as it is spread over a shaft in the plane of its seating groove, the ring being shown in elevation and the shaft in transverse section.
Figure 3:
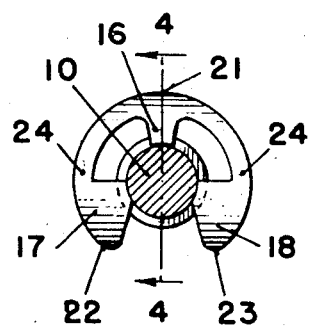
Figs. 3 and 4 are views corresponding to Figs. 1 and 2 illustrating the improved ring in its fully seated position.

In the drawings, reference character 10 designates a carrying member such as a shaft for mounting a machine part 11 such as a gear, bearing race, pulley or the like, the shaft being provided with a groove 12 into which a retaining ring 13 is seated in such manner as to provide an artificial shoulder for locating the machine part 11 and for securing it against axial displacement relative to shaft. The retaining ring is of the general type disclosed in United States Patent No. 2,026,454 comprising an annular, open-ended ring body formed with two inner edge recesses 14, 15 disposed symmetrically to the sides of a center line extending through the middle portion of the ring, and so arranged as to result in the formation of three inwardly directed protrusions or tongues 16, 17 and 18, of which the protrusion 16 extends from the ring body middle portion and the protrusions 17, 18 are disposed in the zone of the ring ends, which latter terminate in end points 22, 23 (Fig. 3) defined by the intersection of the outer circular edge of the ring body which is continued beyond the protrusions 17, 18, and the straight end edges of the ring which lead to the ring opening. The inner edges 16a, 17a, 18a of the protrusions are formed as arcs of a circle of radius $r$ which is somewhat less than the radius $r'$ of the circle of the bottom of the shaft groove 12 in which the ring seats. In assembling such a ring, it is spread directly over the shaft in the plane of the groove 12 and, as seen in Fig. 1, the open ends of the ring as defined by the protrusions 17, 18 will spread slightly, but the greatest bending strain will be taken up in the middle section of the ring, namely, in the region of the middle protrusion 16. Accordingly, upon the ring being fully seated in its groove 12, as illustrated in Fig. 3, the edges 16a, 17a, 18a of the protrusions 16, 17 and 18, respectively, engage with spring pressure against the bottom of the groove, whereby the ring firmly secures itself against said bottom to the degree that relative rotation between ring and shaft or machine part is precluded.

Figure 2:
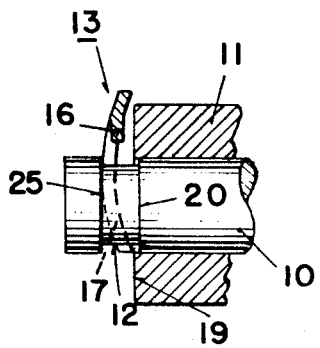
Fig. 2 is a section taken along line 2—2 of Fig. 1.
Figure 4:
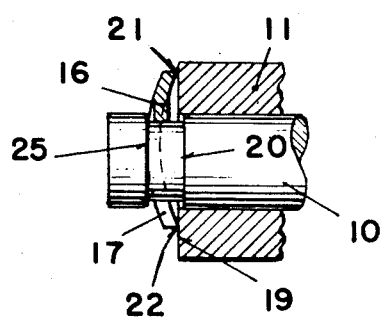

Rather than being a flat or plane form ring as heretofore, the ring according to the invention is symmetrically bowed about a line extending transversely of the ring and substantially intermediate the middle portion and the end points 22, 23 thereof, so that the ring in side elevation conforms to the arc of a cylindrical surface of predetermined, fixed radius. Referring more particularly to Figs. 2 and 4, which illustrate a typical retaining ring assembly employing the bowed opening ring according to the invention, the machine part 11 is arranged relative to the shaft groove 12 so that its end face 19 which is adapted to be engaged by the ring overhangs the inner wall 20 of the groove. Accordingly, when the ring is in fully seated position, as illustrated in Fig. 4, it is reactive, due to its bowed construction, between the outer end wall 25 of the groove and the end face 19 of the machine part 11, thereby to exert axial pressure against the machine part.

The degree of bowing imparted to the ring is such as to provide that the distance between a plane tangent to the ring at the middle and end points 21, 22, 23 of one face thereof and a plane tangent to intermediate points 24 on its opposite face at least equals and preferably exceeds by a small amount the sum total of the maximum possible tolerances in the dimensioning of the machine part 11, of the thickness of the ring itself, and in the location of the groove in the shaft. At the same time, the effective width of the shaft groove, i. e. the distance between the groove side walls 20, 25, is somewhat larger than that provided for flat or plane form rings by an amount which substantially equals the sum total of the aforesaid tolerances. Accordingly, as the ring seats in its goove, it is compressed in axial direction between the machine part end face 19 and the outer side wall 25 of the groove. Due to its spring construction, the compressed ring tends to return to its initially bowed shape and thereby exerts resilient endwise pressure against the machine part. By proper design of the ring, such pressure is sufficient to take up any end play of the machine part, whereby the ring is effective to secure the machine part in a substantially fixed position required, for example, in a mounting wherein the precision location of the machine part is important. Stated in other words, the bowed open ring according to the invention acts simultaneously as a conventional circular spring retaining ring of the type shown in Patent No. 2,026,454 and, consequent to its bowing and its ability to react against the outer wall of its groove as a double leaf spring which exerts resilient endwise pressure against the machine part which it locates.

Preferably, the free or inner end of the protrusion 16 is not bowed as is the rest of the ring body and the end protrusions 17, 18 but is formed straight, as seen in Figs. 2 and 4, so that upon ring assembly it extends parallel to the machine part end face 19 and the side walls of the groove 12. The straightway formation of the protrusion 16 as it depends into the ring opening is desirable because, if bowed to correspond to the bowing of the ring proper, its inner edge 16a could engage against the outer side wall 25 of the groove and thus interfere with the desired functioning of the ring.

Without further analysis, it will be seen that the bowed open retaining ring of the invention represents a distinct and appreciable improvement over the flat or plane open ring of the type shown in the aforesaid Patent No. 2,026,454 in that, while retaining the advantages of the patented ring, it also enables such a ring to take up any end play of the machine part being located thereby, and hence enlarges the application of the patented ring to installations wherein precision location of the machine part is of importance.

As many changes could be made in carrying out the above constructions without departing from the scope of the invention, it is intended that all matter contained in the above description or shown in the accompanying drawing shall be interpreted as illustrative and not in a limiting sense.

I claim:

1. A spring retaining ring of the so-called "open" type adapted to be sprung into a seating groove provided therefor in a shaft or like carrying member and thereupon to form an artificial shoulder for securing a machine part mounted on said shaft against axial displacement, said ring comprising an open-ended ring body and middle and end protrusions extending inwardly from said body, the inner edges of the protrusions being formed as arcs of the circle of the ring opening having predetermined radius which is less than the radius of the circle of the groove bottom, the open ends of the ring terminating in points defined by the intersection of the outer circular edge of the ring body and the end edges of the ring which lead to the ring opening, the ring body being bowed about a line extending transversely of the ring substantially intermediate its middle portion and said pointed ends by a calculated amount which is at least as great as the sum total of the maximum permissible tolerances in the dimensioning of the machine part to be secured thereby, in the thickness of the ring, and in the location of the groove in its shaft, the end protrusions being bowed similarly to the ring body, and the middle protrusion being unbowed and depending into the ring opening.

2. A retaining ring assembly comprising the combination of a shaft provided with a ring seating groove, a machine part carried by the shaft, and a spring retaining ring of the open type spring-seated in the groove, the effective width of the groove being greater than the axial thickness of the ring by an amount which is at least as great as the total of the permissible tolerances in the dimensioning of the machine part, in the thickness of the ring, and in the groove location, said machine part being disposed so that an end face thereof overhangs the inner wall of the groove, whereby said ring is operative between the outer wall of the groove and said overhanging end face, the ring comprising a ring body having middle and end protrusions extending inwardly from its inner circumference, the inner edges of said protrusions being formed as arcs of the circle of the ring opening having initial diameter which is slightly less than that of the circle of the groove bottom whereby said inner edges engage with spring pressure against the bottom wall of the groove, the open ends of the ring terminating in points defined by the intersection of the outer circular edge of the ring body and the end edges of the ring leading to the ring opening, and said ring body being bowed along a line extending transversely of the ring substantially intermediate its middle portion and said pointed ends by an amount which is at least equal to the sum total of the aforesaid tolerances whereby the ring functions as a circular spring ring and as a leaf spring exerting endwise pressure against the machine part, the end protrusions being bowed similarly to the ring body, the middle protrusion being unbowed and lying parallel to and spaced slightly from the front wall of the groove.

HEINRICH HEIMANN.

REFERENCES CITED

The following references are of record in the file of this patent:

UNITED STATES PATENTS

| Number | Name | Date |
| --- | --- | --- |
| 319,742 | Nevegold | June 9, 1885 |
| 2,026,454 | Benzing | Dec. 31, 1935 |